Sept. 22, 1936.  J. S. SESSA  2,055,315
FINGER RING
Filed May 11, 1936
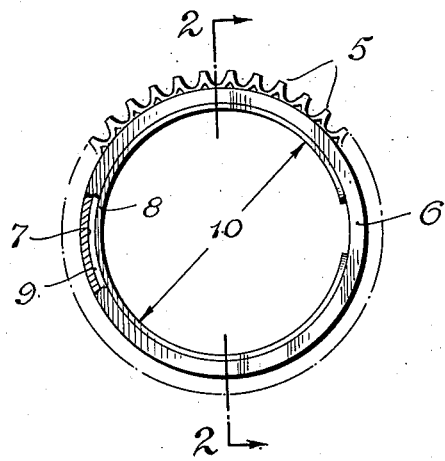
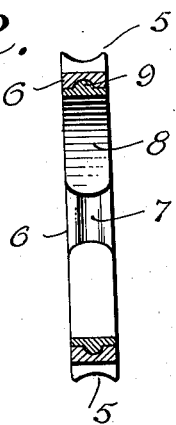
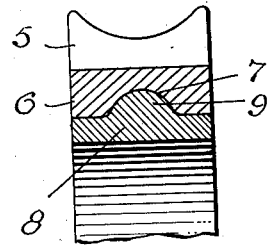
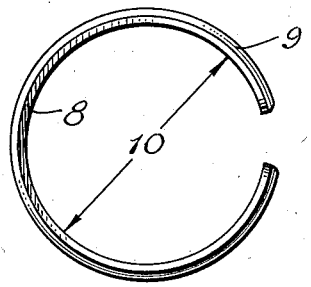
INVENTOR.
JOSEPH S. SESSA
BY
ATTORNEYS Patented Sept. 22, 1936

2,055,315

UNITED STATES PATENT OFFICE 2,055,315

FINGER RING

Joseph S. Sessa, Rutherford, N. J.

Application May 11, 1936, Serial No. 78,970

1 Claim. (Cl. 63—17)

My invention relates to finger rings and has for its object to provide a novel and simple device whereby the inner diameters of such rings, or in other words, the sizes thereof may be selectively adjusted at will in an efficient manner and without in any way adversely affecting the appearance of the ring. Other more specific objects will appear from the description hereinafter and the features of novelty will be pointed out in the claim.

In the accompanying drawing which shows an example of the invention without defining its limits, Fig. 1 is a side view of a finger ring equipped with the novel device; Fig. 2 is a sectional view on the line 2—2 of Fig. 1; Fig. 3 is a fragmentary sectional view similar to Fig. 2 on an enlarged scale, and Fig. 4 is a side view of the novel device.

Because of the fact that the novel device for reducing the inner diameters of rings is specially adapted for use in connection with wedding rings of the type which include a plurality of adjacent settings 5 in which diamonds or other gems may be mounted, this type of ring has been selected for the purpose of illustrating and describing the invention. This is not to be construed as defining the limits of the invention which obviously may be used with equal efficiency in connection with other forms of finger rings.

In the specific form shown in the drawing the circular band 6 of the ring is provided upon its inner surface with a circumferential groove 7 preferably extending without interruption along the circumferential center line of the band 6 in the form of an annulus. The novel device itself comprises a size adjusting split ring 8 formed upon its exterior surface with a circumferential rib 9 preferably extending along the circumferential center line of the split ring 8, as illustrated in Figs. 2 and 3. The groove 7 and rib 9 are of complemental shapes in cross-section and so dimensioned that when the inner split ring 8 is in its operative position, the rib 9 will snugly fit the groove 7.

From the drawing it will be apparent that the size adjusting split ring 8 may be sprung into place within the band 6 of a given finger ring with the rib 9 fitted into the groove 7 and the inner ring 8 lying in surface engagement with the inner surface of the band 6, as shown in Fig. 1. The circumferential dimension of the split ring 8 is such that it completely covers substantially the entire inner surface of the band 6, with the opposed ends of the inner ring 8 in relatively close proximity to each other as illustrated in Fig. 1.

Furthermore, the transverse width of the band 6 and the ring 8 are alike or, in other words, correspond with each other, the arrangement being such that when combined with each other the inner ring 8 will register accurately with the band 6 of the finger ring. It will be noted that the rib 9 extends continuously along the outer surface of the ring 8 in a circumferential direction and that said rib 9 terminates in proximity to the opposite ends of the split inner ring 8 as clearly shown in Fig. 4.

In practice the size adjusting split ring 8 may readily be sprung into place within the band 6 of a given finger ring with the rib 9 fitted into the groove 7 to thereby removably fix said ring 8 in position within said band 6 of the particular finger ring. When thus placed in position the split inner ring 8 will lie in surface engagement with the inner surface of the band 6 throughout substantially the entire circumferential dimension thereof in accurate registry with the band 6 and itself will provide a smooth substantially continuous inner surface for engagement with the finger of the wearer. In the preferred arrangement the co-operating elements are accurately dimensioned and located with respect to each other so that when said split inner ring 8 has been combined with a given finger ring, its presence will be practically unnoticed and the general appearance of the ring remains unchanged. It further will be obvious when the inner split ring 8 has been combined with the band 6 of a given finger ring that the normal internal diameter of the ring will be reduced to the internal diameter 10 of the size adjusting split ring 8.

The novel device is particularly adapted for use in connection with wedding rings of the class illustrated which include a series of adjacent settings 5 arranged about the outer circumference of the ring in continuous succession. Because of the presence of the settings 5 on the outer periphery of such a ring, it is difficult if not impossible, to reduce the size of such rings in the ordinary way. The novel size adjusting split ring 8 overcomes this difficulty and is capable of being placed in position and removed at will without the necessity for any particular skill on the part of the person effecting the combination or removal and without requiring the ring to be cut or otherwise mutilated. The accurate dimensioning and relative location of the groove 7 and rib 9 automatically fix the size adjusting split ring 8 in proper position within the band 6 of a given ring so that no special care is required in combining the split ring 8 with the finger ring. By providing size adjusting split rings 8 of different radial thicknesses, the diameter 10 may be varied to make a given ring correspond to a variety of different sizes without requiring said ring to be cut or otherwise mutilated to bring about this result. It is thus possible to accurately fit fingers of varying sizes without requiring the jeweler to carry a large stock of rings having different internal diameters to meet this condition.

It is well known that under certain conditions the outer dimensions of a finger upon which a ring is worn vary from time to time so that a ring which is somewhat loose under certain conditions becomes abnormally tight and uncomfortable under other conditions. With the instant arrangement the size reducing split ring 8 may be inserted within the band 6 when the ring is too loose and may be easily removed from said band when the ring becomes too tight for comfort. As previously stated, although the novel device is especially designed for use with wedding rings of the type illustrated, it is capable of efficient use in connection with other forms of rings. The provision of the novel arrangement does not add materially to the cost of production of the ring and in no way visibly affects the ornamental appearance thereof. When in its operative position the size reducing split ring 8 is firmly secured in place against any accidental dislocation and because of the fact that it extends circumferentially throughout substantially the entire surface of the band 6, provides a smooth and practically unbroken inner surface which produces no discomfort to the wearer of the particular ring.

By having a plurality of size reducing split rings 8 of different radial dimensions on hand, a ring of normal internal diameter may be readily converted to smaller sizes and actually have its appearance enhanced by the presence of the selected size reducing split ring 8; in other words, with the split ring 8 in place the ring appears heavier and accordingly presents the appearance of increased value.

Various changes in the specific form shown and described may be made within the scope of the claim without departing from the spirit of the invention.

I claim:

The combination of a finger ring provided with a continuous circumferential groove on its inner surface, a size-adjusting split ring fitted within said finger ring in surface engagement therewith substantially throughout the inner circumference of said finger ring, said rings corresponding in transverse width and registering with each other, and a circumferential rib on the outer surface of said split ring terminating in proximity to the opposite ends thereof, said rib being arranged to fit into said groove for removably fixing the split ring in position within the finger ring.

JOSEPH S. SESSA.